United States Patent
Lin et al.

(10) Patent No.: US 8,259,402 B2
(45) Date of Patent: Sep. 4, 2012

(54) LENS ASSEMBLY AND CAMERA MODULE HAVING SAME

(75) Inventors: Hou-Yao Lin, Taipei Hsien (TW); Sheng-Jung Yu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 176 days.

(21) Appl. No.: 12/758,033

(22) Filed: Apr. 12, 2010

(65) Prior Publication Data

US 2011/0075276 A1   Mar. 31, 2011

(30) Foreign Application Priority Data

Sep. 28, 2009   (CN) .......................... 2009 1 0307849

(51) Int. Cl.
    *G02B 7/02* (2006.01)
(52) U.S. Cl. .................. 359/819; 359/704; 359/811
(58) Field of Classification Search .......... 359/694–704, 359/811–829
    See application file for complete search history.

(56) References Cited

U.S. PATENT DOCUMENTS

| 7,417,807 | B2 * | 8/2008 | Chiang | 359/811 |
| 7,419,315 | B2 * | 9/2008 | Hirata et al. | 396/529 |
| 7,471,473 | B2 * | 12/2008 | Shintani | 359/819 |
| 7,626,773 | B2 * | 12/2009 | Noda et al. | 359/819 |
| 7,869,146 | B2 * | 1/2011 | Noh et al. | 359/811 |
| 7,929,226 | B2 * | 4/2011 | Yen | 359/819 |

* cited by examiner

*Primary Examiner* — Mohammed Hasan
(74) *Attorney, Agent, or Firm* — Altis Law Group, Inc.

(57) ABSTRACT

A lenses assembly includes a first lens, a second lens, and adhesive material. The first lens includes two axially extending protrusions. The second lens includes two radially extending protrusions. The second lens engages with the first lens by engagement between the axially extending protrusions and radially extending protrusions. The axially extending protrusions and radially extending protrusions are alternately arranged around a circumferential direction of the first lens. The adhesive material is filled into gaps between the engaged protrusions to fixedly interconnect the first lens and the second lens.

11 Claims, 4 Drawing Sheets

LENS ASSEMBLY AND CAMERA MODULE HAVING SAME

BACKGROUND

1. Technical Field

The disclosure relates to a lens assembly, and a camera module using the lens assembly.

2. Description of Related Art

Lenses in a camera module are used to converge light from objects to a photosensitive element, such as film, a Charge Coupled Device (CCD) or complementary metal oxide semiconductor (CMOS) and so on, to form images of the objects. Camera modules may employ more than one lens for better modulating light, however, it is difficult to keep the lenses coaxial to each other. Generally, lenses used in a camera each will have a flat periphery that is useful for connecting with other lenses or the holder, but useless for maintaining coaxiality.

Therefore it is desirable to provide a lens assembly which can overcome the above problems.

DETAILED DESCRIPTION

Figure 1:
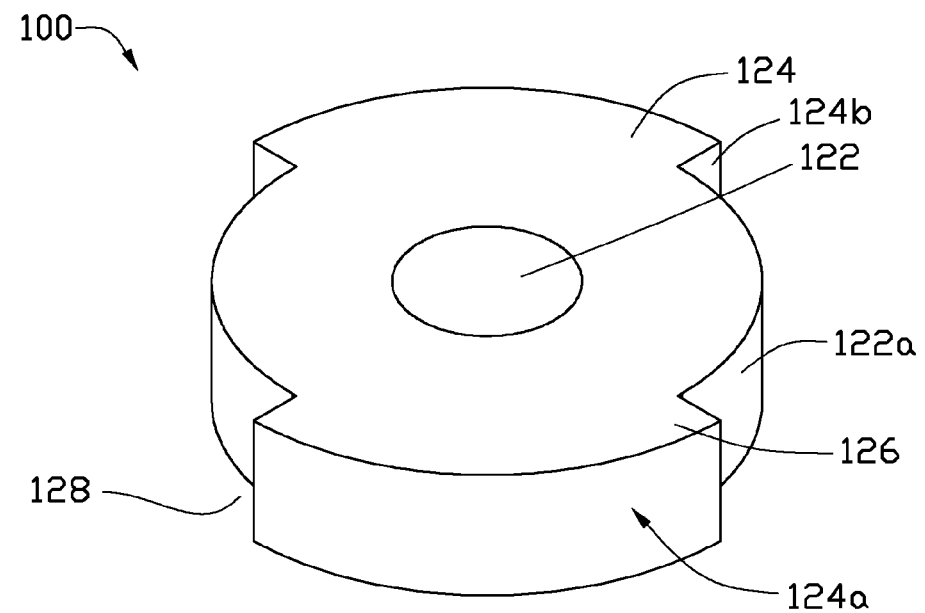
FIG. 1 is an unassembled isometric view of a lens assembly in accordance with one embodiment.
Figure 1:
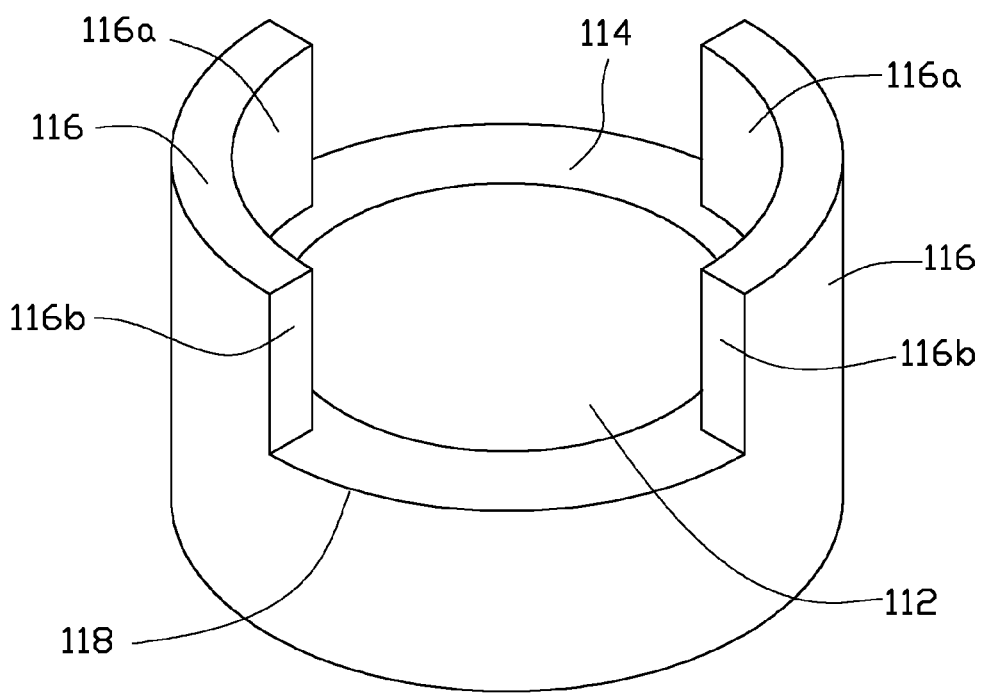
Figure 2:
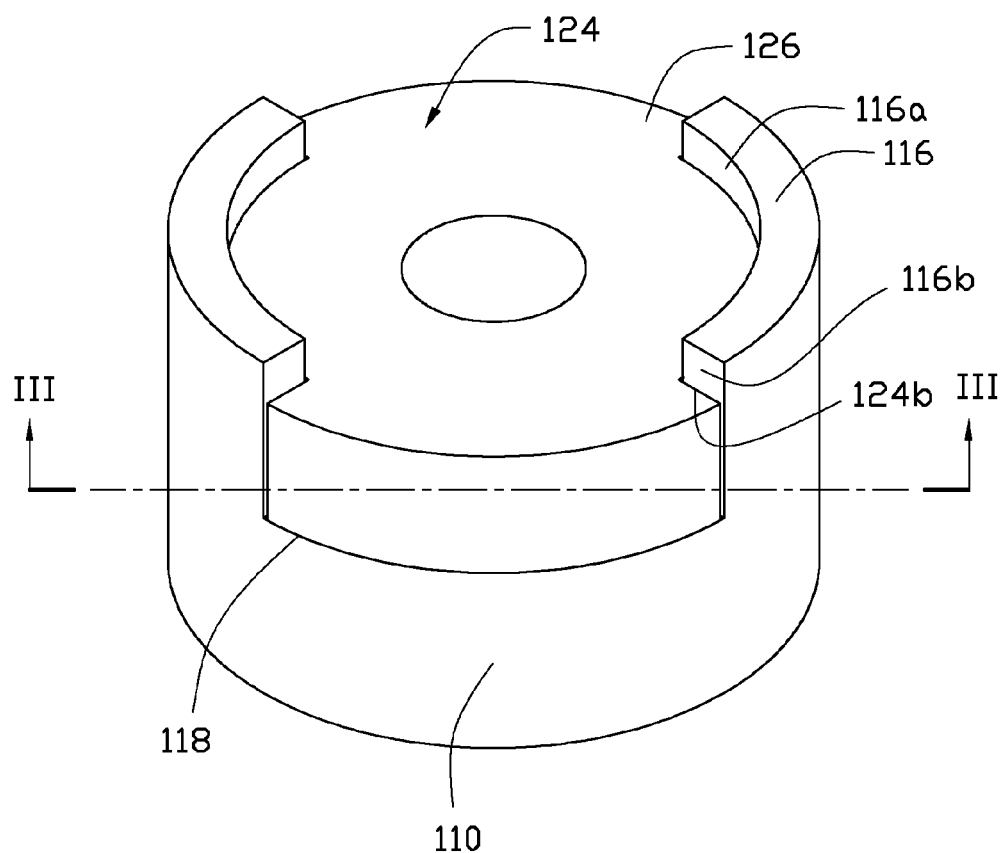
FIG. 2 is an assembled isometric view of the lens assembly of FIG. 1.
Figure 3:
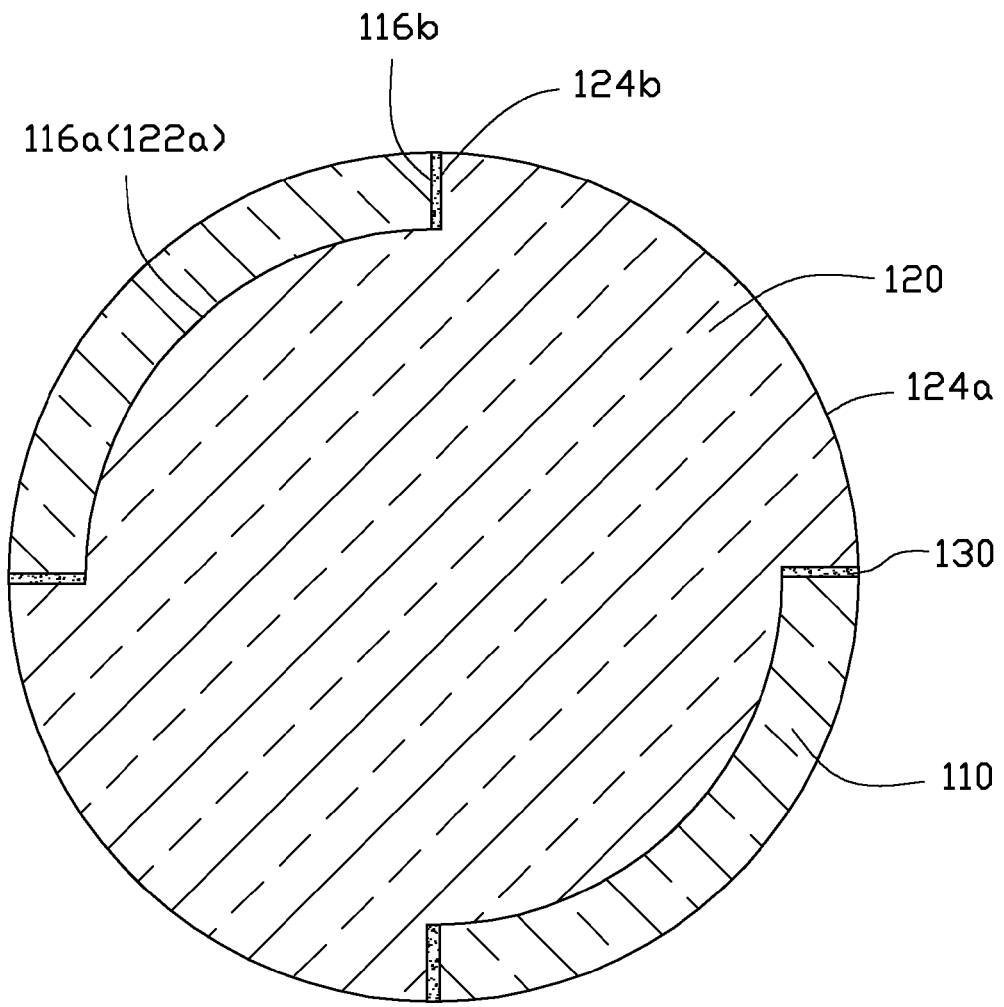
FIG. 3 is a cross-sectional schematic view of the lens assembly of FIG. 2 along a line III-III.
Figure 4:
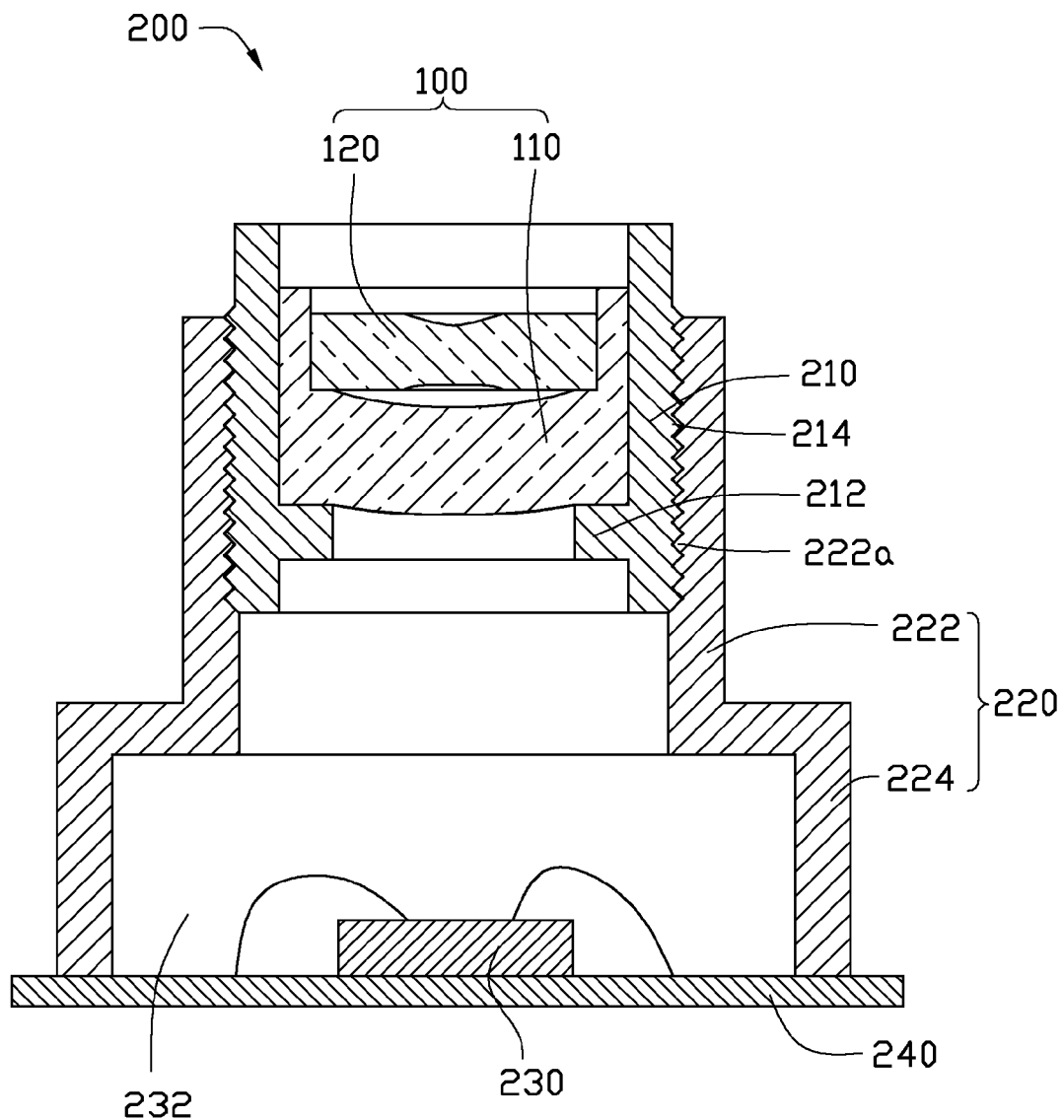
FIG. 4 is a cross-sectional schematic view of a camera module using the lens assembly of FIG. 1.

Referring to FIGS. 1 to 3, a lens assembly 100 includes a first lens 110, a second lens 120, and adhesive material 130. The first lens 110 includes two axially extending protrusions. The second lens 120 includes two radially extending protrusions. The first lens 110 and the second lens 120 are engaged with each other by the axially extending protrusions and radially extending protrusions. The axially extending protrusions and radially extending protrusions alternately arranged around a circumferential direction of the first lens 110. The adhesive material 130 is filled in the gaps between the protrusions of the first and second lenses 110, 120 to interconnect the first and second lenses 110, 120 together.

The first lens 110 includes a central optically active portion 112 and a peripheral optically non-active portion 114 surrounding the central optically active portion 112. Two opposite engaging walls 116 served as the axially extending protrusions extend from the peripheral portion 114 along a direction parallel to the center axis of the first lens 110 and surrounding the central optically active portion 112. Each of the engaging walls 116 includes a cylindrical inner surface 116a and opposite side surfaces 116b at opposite sides of the inner surface 116a. Each of the engaging walls 116 has a dovetail cross-section perpendicular to the center axis of the first lens 110. In other words, the cross-sections of the engaging walls 110 are tapered. A pair of first notches/intervals 118 exists between the engaging walls 116. Each of the notches 118 also has a dovetail-shaped cross-section perpendicular to the center axis of the first lens 110. In other words, the cross-sections of the notches 118 are tapered.

The second lens 120 includes a central optically active cylindrical portion 122 and an optically non-active portion 124 surrounding the central portion 122. The central optically active cylindrical portion 122 includes two opposite cylindrical first faces 122a. A pair of second notches/intervals 128 is evenly defined on the optically non-active portion 124 to form a two opposite cylindrical first faces 122a on the central portion 122, divide the outer surface of the non-active portion 124 into two second faces 124a, and from four step surface between the neighboring first and second faces. The two radially extending protrusions protrusions 126 are formed between the second notches/intervals 128. Each of the first protrusions 126 has a dovetail shaped, i.e., tapered in cross section perpendicular to the center axis of the second lens 120, and the first protrusions 126 are symmetrical about the center of the second lens 120. Each of the first protrusions 126 is slightly smaller than the first notches 118 of the first lens 110 and is capable of being easily inserted into the first notches 118 correspondingly.

In assembly, the first lens 110 and the second lens 120 are engaged with each other through the engaging walls 116 and the first protrusions 126. The engaging walls 116 and first protrusions 126 are respectively received in the second and first notches 128, 118, and the first surfaces 122a of the second lens 120 fittingly engage with and between the inner surfaces 116a. The step surface 124b of the second lens 120 is opposite to the respective side surface of the engaging walls 116, and at least two gaps are arranged between the step surface of the second lens and the side surface of the engaging walls. One of the lenses 110, 120 is rotated to be concentric with the other, the adhesive material 130 is filled into the gaps between the engaging walls 116 and first protrusions 126 and cured to fix the first and second lenses 110, 120 together. After the first and second lenses 110, 120 are fixedly interconnected together, they cannot be easily moved relative to each other even if heavily shaken thereby coaxiality of the lenses 110, 120 is maintained.

Referring FIG. 3, a camera module 200 includes an externally threaded barrel 210, a holder 220, a sensor 230, and a substrate 240.

The barrel 210 is configured for receiving the lens assembly 100. The lens assembly 100 is adhered on the inner side of the barrel 210 where an annular flange 212 is formed for holding the lens assembly 100. The barrel 210 can be screwed into the holder 220 due to the outer thread 214. Alternatively, the barrel 210 can be fixed in the holder 220 by other means such as with an adhesive or with a snap fit.

The holder 220 includes a first compartment 222, and a second compartment 224 communicating with the first compartment 222. The first compartment 222 is used for receiving the barrel 210. An inner thread 222a is formed on the inner side of the holder 220 and protrudes towards the first compartment 222, to mate with the outer thread 314, thereby the barrel 210 can be screwed into the holder 220. The second compartment 224 is defined below the first compartment 222 for receiving the sensor 230. The holder 220 is mounted on the substrate 240 thereby accommodating the sensor 230 mounted on the substrate 240.

The sensor 230 is a photosensitive electronic member, such as a CCD or CMOS, which is mounted on the substrate 240 and electrically connected to the substrate 240.

The substrate 240 is a base for holding the holder 220 and the sensor 230, and may be made of, for example, ceramic or plastic material.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A lens assembly comprising:
a first lens comprising two axially extending protrusions, two opposite first notches being defined between the axially extending protrusions;
a second lens defining two opposite second notches, two radially extending protrusions formed between the second notches, the axially extending protrusions of the first lens and the radially extending protrusions of the second lens respectively engaged in the corresponding second and first notches; and
adhesive material filled into gaps between the engaged protrusions to fixedly interconnect the first lens and the second lens.

2. The lens assembly of claim 1, wherein the first lens comprises a central optically active portion, a peripheral optically non-active portion surrounding the central portion, the axially extending protrusions extending from the periphery of a top surface of the peripheral portion along a direction parallel to the center axis of the first lens and surrounding the central portion; two opposite first notches is defined between the axially extending protrusions; the second lens comprises a central optically active cylindrical portion, an optically non-active portion surrounding the central optically active cylindrical portion; and the two second notches are defined on the optically non-active portion.

3. The lens assembly of claim 2, wherein the two axially extending protrusions of the first lens are symmetrical about the center of the first lens.

4. The lens assembly of claim 2, wherein the radially extending protrusions of the second lens are symmetrical about the center of the second lens.

5. A camera module comprising:
a circuit board;
a sensor mounted on the circuit board;
a holder mounted on the circuit board and receiving the sensor therein;
a barrel fixedly received in the holder; and
a lenses assembly comprising:
a first lens comprising two axially extending protrusions, two opposite first notches being defined between the axially extending protrusions;
a second lens defining two opposite second notches, two radially extending protrusions formed between the second notches, the axially extending protrusions of the first lens and the radially extending protrusions of the second lens respectively engaged in the corresponding second and first notches;
adhesive material filled into gaps between the engaged protrusions to fixedly interconnect the first lens and the second lens; and
wherein the first and second lenses are held in the barrel.

6. The camera module of claim 5, wherein the first lens comprises a central optically active portion, a peripheral optically non-active portion surrounding the central portion, the axially extending protrusions extending from the periphery of a top surface of the peripheral portion along a direction parallel to the center axis of the first lens and surrounding the central portion; two opposite first notches is defined between the axially extending protrusions;
the second lens comprises a central optically active cylindrical portion, an optically non-active portion surrounding the central optically active cylindrical portion; and the two second notches are defined on the optically non-active portion.

7. The camera module of claim 6, wherein the two axially extending protrusions of the first lens are symmetrical about the center of the first lens.

8. The camera module of claim 7, wherein the radially extending protrusions of the second lens are symmetrical about the center of the second lens.

9. A lens assembly comprising:
a first lens comprising a central optically active portion, a peripheral optically non-active portion surrounding the central portion, an axially extending protrusions extending from the periphery of a top surface of the peripheral portion along a direction parallel to the center axis of the first lens and surrounding the central portion, two opposite first notches defined between the axially extending protrusions;
a second lens comprising a central optically active cylindrical portion, an optically non-active portion surrounding the central optically active cylindrical portion, two opposite notches defined on the optically non-active portion and the radially extending protrusions formed between the second notches, the axially extending protrusions of the first lens and the radially extending protrusions of the second lens being respectively engaged in the corresponding second and first notches; and
adhesive material filled into gaps between the engaged protrusions to fixedly interconnect the first lens and the second lens.

10. The lens assembly of claim 9, wherein the two axially extending protrusions of the first lens are symmetrical about the center of the first lens.

11. The lens assembly of claim 9, wherein the radially extending protrusions of the second lens are symmetrical about the center of the second lens.

* * * * *